(12) United States Patent
Fukai

(10) Patent No.: US 7,454,129 B2
(45) Date of Patent: Nov. 18, 2008

(54) COLLAPSIBLE-TYPE LENS BARREL AND IMAGE SENSING APPARATUS WITH WITHDRAWING BLUR CORRECTION LENSES

(75) Inventor: Yosuke Fukai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 11/254,437

(22) Filed: Oct. 19, 2005

(65) Prior Publication Data
US 2006/0083503 A1    Apr. 20, 2006

(30) Foreign Application Priority Data
Oct. 19, 2004   (JP)   ............... 2004-304342
Mar. 1, 2005    (JP)   ............... 2005-056211

(51) Int. Cl.
*G03B 17/00* (2006.01)
(52) U.S. Cl. ............... 396/55; 396/53; 396/72; 348/208.16
(58) Field of Classification Search ............... 396/55, 396/72, 73; 359/554–557
See application file for complete search history.

(56) References Cited

U.S. PATENT DOCUMENTS

| | | | |
|---|---|---|---|
| 5,099,263 A * | 3/1992 | Matsumoto et al. ............ | 396/75 |
| 5,398,132 A | 3/1995 | Otani | |
| 5,930,042 A * | 7/1999 | Miyamoto et al. ........... | 359/557 |
| 5,969,886 A * | 10/1999 | Sato et al. ............ | 359/813 |
| 6,112,028 A * | 8/2000 | Okada ............ | 396/55 |
| 6,295,412 B1 * | 9/2001 | Katano et al. ............ | 396/55 |
| 6,701,071 B2 * | 3/2004 | Wada et al. ............ | 396/55 |
| 6,978,089 B2 | 12/2005 | Nomura et al. | |
| 7,009,781 B2 * | 3/2006 | Oshima et al. ............ | 359/697 |
| 2005/0128342 A1 * | 6/2005 | Izukawa ............ | 348/360 |

FOREIGN PATENT DOCUMENTS

| | | |
|---|---|---|
| CN | 1439929 | 9/2003 |
| JP | 2003-315861 | 11/2003 |
| JP | 3513329 | 1/2004 |
| JP | 2004-101721 | 4/2004 |

OTHER PUBLICATIONS

First Office Action issued on Apr. 6, 2007 for Chinese patent application No. 2005101092336.

* cited by examiner

*Primary Examiner*—Christopher Mahoney
*Assistant Examiner*—Linda B Smith
(74) *Attorney, Agent, or Firm*—Morgan & Finnegan, L.L.P.

(57) ABSTRACT

A collapsible-type lens barrel includes an image blurring correction unit that drives a first lens in a plane orthogonal to an optical axis so as to cancel shaking of an image sensing apparatus, and a second lens placed adjacent the image blurring correction unit. When the collapsible-type lens barrel is in the collapsed state, the image blurring correction unit causes the first lens to withdraw to a position away from the optical axis of the second lens, and causes the second lens to retract in such a manner that a portion of the second lens enters at least part of a space on the optical axis produced by the withdrawal of the first lens.

10 Claims, 8 Drawing Sheets

COLLAPSIBLE-TYPE LENS BARREL AND IMAGE SENSING APPARATUS WITH WITHDRAWING BLUR CORRECTION LENSES

CLAIM OF PRIORITY

This application claims priority from Japanese Patent Application No. 2004-304342 filed on Oct. 19, 2004 and Japanese Patent Application No. 2005-056211 filed on Mar. 1, 2005, which are hereby incorporated herein by reference herein.

FIELD OF THE INVENTION

This invention relates to a collapsible-type lens barrel having an image blurring correction mechanism for driving part of an image sensing optical system and optically correcting for shaking of an image sensing apparatus due to an unsteady hand, and to an image sensing apparatus such as a camera equipped with such a collapsible-type lens barrel.

BACKGROUND OF THE INVENTION

A collapsible-type zoom lens barrel is so adapted that a group of lenses for sensing the image of a subject is compactly accommodated within a camera body when an image is not being sensed and is projected from the camera body only when an image is to be sensed.

Cameras have become increasingly compact in recent years and it is now required that the collapsible-type zoom-lens lens barrel have a shorter accommodating length for accommodating the lens group in the camera body when an image is not being sensed. However, the accommodating length of the collapsible-type zoom lens depends upon the thickness of the lens group inside the lens barrel and it cannot be reduced to a length less than that of the thickness of the lens group.

In order to deal with this problem, it has been proposed to reduce the accommodating length of the lens barrel by withdrawing some of a plurality of optical elements to a position away from the optical axis of the remaining optical elements, and accommodating at least some of the optical elements, other than those withdrawn, in the space on the optical axis where the withdrawn optical elements were located (see the specification of Japanese Patent Application Laid-Open No. 2003-315861).

Further, in addition to the need for more compact cameras, an improvement in image quality also is required. Accordingly, a lens barrel equipped with an image blurring correction mechanism for optically correcting for camera shake as caused by an unsteady hand has been proposed (see the specification of Japanese Patent No. 3513329 and the specification of Japanese Patent Application Laid-Open No. 2004-101721).

With the method described in Japanese Patent Application Laid-Open No. 2003-315861, however, a withdrawing member such as a torsion bar, which is unnecessary when an image is sensed, is required as a component needed to withdraw some of the optical elements from the optical axis. This leads to an increase in cost.

SUMMARY OF THE INVENTION

The present invention has been made in consideration of the above-mentioned circumstances and its object is to reduce the accommodating length of a collapsible-type lens barrel, through a simple arrangement and without an increase in cost, in such a manner that this length will be less than the total thickness of respective optical members in lens groups.

According to the present invention, the foregoing object is attained by providing a collapsible-type lens barrel, comprising: an image blurring correction unit that drives a first lens in a plane orthogonal to an optical axis so as to cancel shaking of an image sensing apparatus; and a second lens placed adjacent the image blurring correction unit; wherein when the collapsible-type lens barrel is in the collapsed state, the image blurring correction unit causes the first lens to withdraw to a position away from the optical axis of the second lens, and causes the second lens to retract in such a manner that a portion of the second lens enters at least part of a space on the optical axis produced by the withdrawal of the first lens.

According to the present invention, the foregoing object is also attained by providing a method of controlling a collapsible-type lens barrel having an image blurring correction unit that drives a first lens in a plane orthogonal to an optical axis so as to cancel shaking of an image sensing apparatus, and a second lens placed adjacent the image blurring correction unit, the method comprising the steps of: causing the first lens of the image blurring correction unit to withdraw to a position away from the optical axis of the second lens in the collapsed state of the collapsible-type lens barrel; and causing the second lens to retract in such a manner that a portion of the second lens enters at least part of a space on the optical axis produced by the withdrawal of the first lens.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

Figure 1:
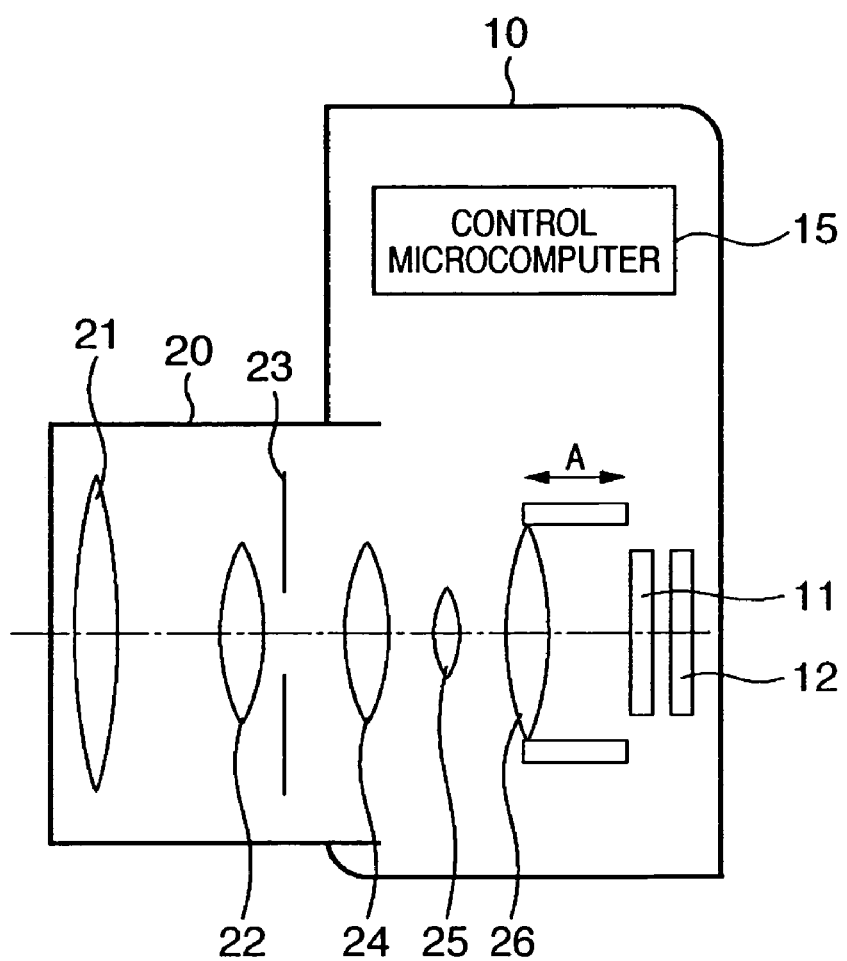
FIG. 1 is a conceptual view illustrating the structure of a lens system when an image is sensed in a digital camera having a collapsible-type zoom lens barrel according to an embodiment of the present invention.

FIG. 1 is a conceptual view illustrating the structure of a lens system in a digital camera having a collapsible-type zoom lens barrel according to an embodiment of the present invention. FIG. 1 shows the lens system in an image sensing state.

As shown in FIG. 1, a collapsible-type lens barrel 20 is shown protruding from a camera body 10 when an image is sensed.

Also shown in FIG. 1 are a first lens group 21; a second lens group 22 of a zooming optical system; a diaphragm shutter unit 23 for controlling the quantity of light by driving diaphragm blades (not shown); a third lens group 24 that constructs the zooming optical system together with the second lens group 22; a lens 25 of an image blurring correction unit which, after blurring of an image as caused by camera shake has been sensed, performs drive in a direction that corrects for blurring by shifting the optical axis in accordance with the amount of shaking; a fourth lens 26 of a focusing optical system; a low-pass filter 11; an image sensing device 12 such as a CCD or CMOS sensor; and a control microcomputer 15. The fourth lens 26 is driven and moved along the optical axis over a driving range A, as illustrated in FIG. 1. Collapsing of the lens barrel and image sensing operations such as focusing and zooming are controlled by actuators (not shown) driven by the control microcomputer 15.

In order to facilitate an understanding of the structure in FIG. 1, the first lens group 21, second lens group 22, third lens group 24 and fourth lens 26 are illustrated as single lenses. Each of these, however, may comprise a plurality of lenses. Further, although only the lens 25 of the image blurring correction unit is illustrated, in this embodiment the image blurring correction unit has a structure that will be described later with reference to FIGS. 2 to 5. The lens 25 of the image blurring correction unit, which is indicated at reference numeral 30, also may comprise a plurality of lenses.

The first lens group 21, second lens group 22, diaphragm shutter unit 23, third lens group 24, lens 25 and fourth lens 26 are moved on the optical axis in parallel with the optical axis while they are guided by a guide bar (not shown). The optical image of a subject that enters via these lenses is formed on the image sensing device 12 through the low-pass filter 11.

The structure of the image blurring correction unit 30 having the lens 25 in this embodiment of the invention will now be described in detail with reference to FIGS. 2 to 5.

Figure 2:
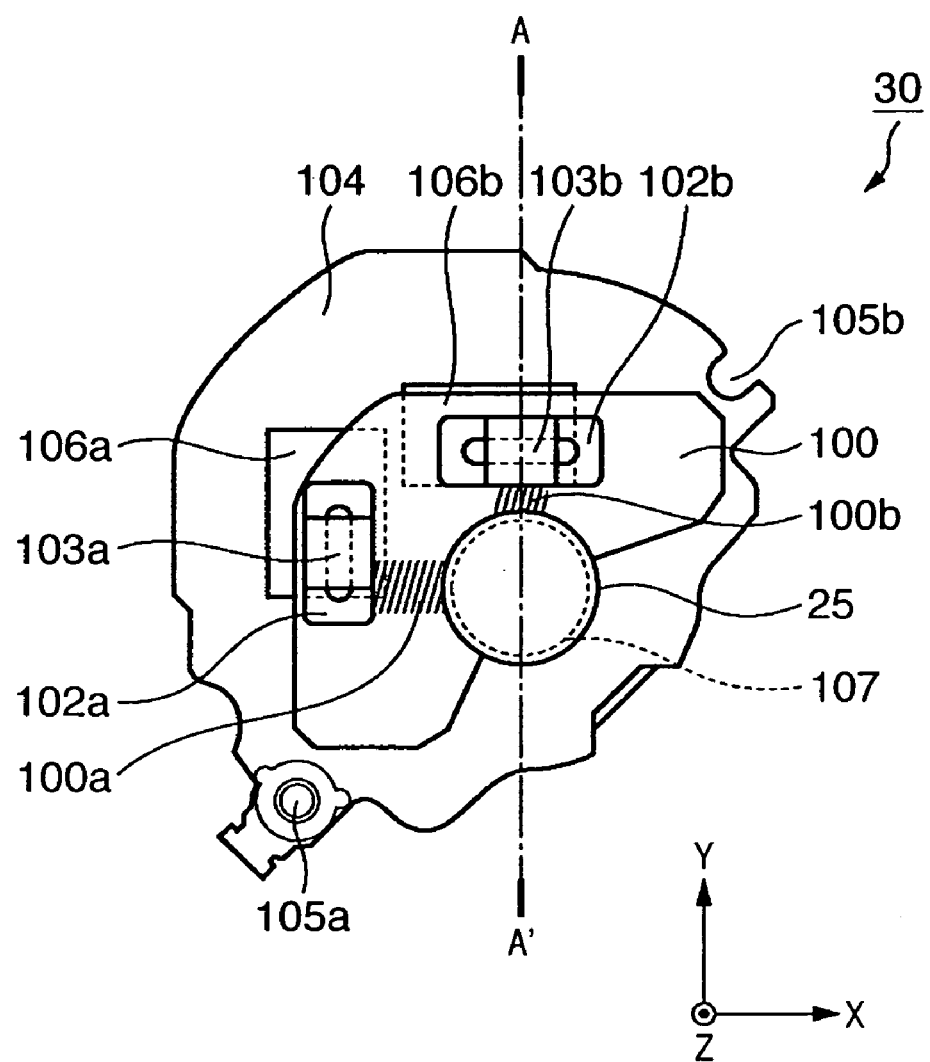
FIG. 2 is a plan view illustrating the structure of an image blurring correction unit in an image sensing state according to the embodiment of the present invention.

FIG. 2 is a plan view illustrating the image blurring correction unit 30 as seen from the side of the subject to be sensed.

In FIG. 2, a movable lens holder 100 holds the lens 25. The movable lens holder 100 has protuberances 100a and 100b provided in order that contact between lenses will be avoided, as will be described later. The movable lens holder 100 has coils 102a and 102b for X and Y directions, respectively. The coils 102a and 102b are arranged perpendicular to each other in a plane orthogonal to the optical axis, as illustrated in FIG. 2, and are used to drive the movable lens holder 100 along the X and Y directions, respectively, as will be described later.

Further, movable yokes 103a and 103b are fixedly held on the coils 102a and 102b, respectively, on movable lens holder 100 on the side that faces the subject to be sensed.

A lens holding frame 104 is arranged on the side of the image sensing device 12 with respect to the movable lens holder 100. The lens holding frame 104 has a hole 105a that engages with a guide bar guided in such a manner that the lens holding frame 104 can be moved parallel to the optical axis when it is moved along the optical axis, and a U-shaped hole 105b that functions as a rotation stopper in order to prevent rotation when the lens holding frame 104 moves. By passing a guide bar and rotation preventing bar (not shown) through the two holes 105a, 105b, respectively, the lens holding frame 104 can move rectilinearly from the collapsed state to the image sensing state and from the image sensing state to the collapsed state.

Magnets 106a, 106b are fixed by the lens holding frame 104 to positions corresponding to the coils 102a, 102b so as to be perpendicular to each other in a plane orthogonal to the optical axis. Reference numeral 107 denotes an opening.

Figure 3:
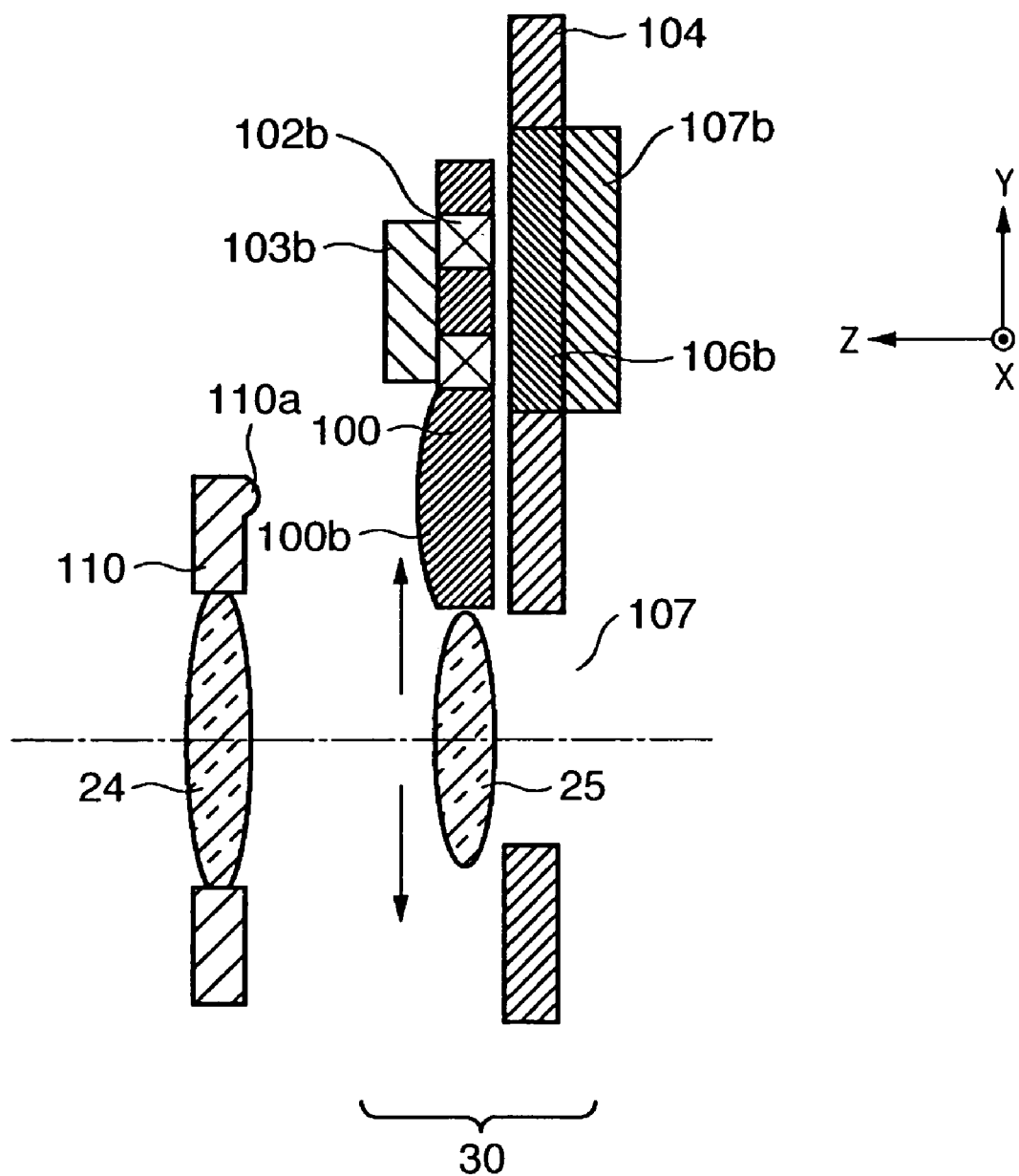
FIG. 3 is a sectional view illustrating the structure of the image blurring correction unit in the image sensing state according to the embodiment of the present invention.

FIG. 3 is a sectional view taken along a line A-A' of FIG. 2 (namely a sectional view along the Y direction) and also illustrates the third lens group 24.

In FIG. 3, a stationary yoke 107b is attracted by the magnet 106b. Although a stationary yoke along the X direction is not illustrated, it also is similarly arranged on the magnet 106a on the side of the image sensing device 12. A holding member 110 holds the third lens group 24 and has a protuberance 110a provided in order to prevent the third lens group 24 and lens 25 from contacting each other during the collapsing operation and in the collapsed state. The protuberance 110a is arranged in the withdrawal direction of the lens 25 in such a manner that it will contact at least one of the protuberances 100a and 100b of the movable lens holder 100 during the collapsing and projecting operations and in the collapsed state. For example, in FIG. 2, in a case where the lens 25 is withdrawn in the direction of a second quadrant, about the optical axis as center, as seen from the side of the subject, the protuberance 110a is formed at positions equidistant from the optical axis as an arc greater than 90° that includes the second quadrant. The shapes of the protuberances 100a, 100b and 110a are suitably designed in accordance with the conditions, such as the shapes of the lens 25 and third lens group 24, the operation of the lens 25, etc., and these shapes are not limited to those set forth above.

In the arrangement shown in FIGS. 2 and 3, two moving-coil electromagnetic actuators are arranged for driving the lens 25 along the X and Y directions.

When an image is to be sensed, the lens 25 being held by the movable lens holder 100 is placed on the same optical axis as that of the other optical system owing to the electromagnetic balance between the two magnets 106a, 106b, which are fixed to the lens holding frame 104, and the movable yokes 103a, 103b, which are fixed to the movable lens holder 100, in a state in which the X- and Y-direction coils 102a, 102b, respectively, are not being energized.

If shaking as by the hand of the photographer that causes image blurring occurs under these conditions, this shaking is sensed by a sensor (not shown) and electricity is supplied to the coils 102a, 102b. By thus energizing the coils 102a, 102b, magnetism is produced between the movable lens holder 100 and the magnets 106a, 106b and stationary yokes 107a, 107b of the lens holding frame 104, thereby the movable lens holder 100 is driven in directions perpendicular to the optical axis, i.e., along the X and Y directions. When the movable lens holder 100 moves in a direction that corrects for (cancels) shaking and arrives at a suitable position, the movable lens holder 100 is held fixed at this location. It should be noted that the method of fixedly maintaining the movable lens holder 100 at this time is not a mechanical fixing method. The movable lens holder 100 is maintained at the suitable position by continuously supplying the electricity to the coils 102a, 102b to thereby maintain the magnetic balance with respect to the magnets 106a, 106b of the lens holding frame 104.

When an image sensing operation subsequently ends, the electricity to the coils 102a, 102b is turned off, the movable lens holder 100 is restored to the original position that prevailed prior to the image sensing operation and the lens 25 is placed on the same optical axis as the other optical system.

Figure 8:
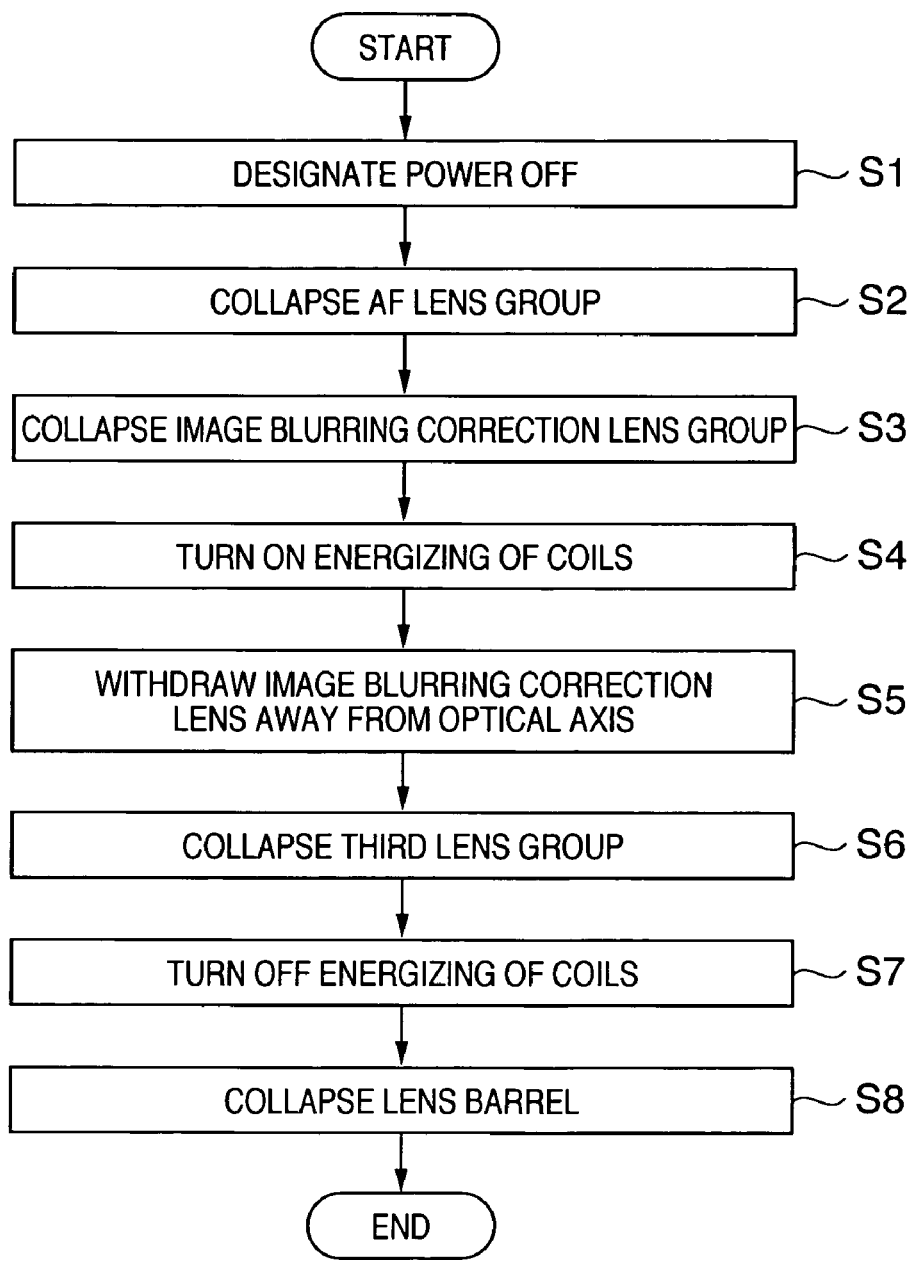
FIG. 8 is a flowchart for describing an operation for collapsing a collapsible-type zoom lens barrel according to an embodiment of the present invention.

Next, reference will be had to the flowchart of FIG. 8 to describe a collapsing operation for collapsing the collapsible-type lens barrel 20, which has the structure set forth above, into the camera body 10. This operation is controlled by the control microcomputer 15. It should be noted that when the camera tube collapses, the lens holding frame 104 is retracted into the camera body 10 along the optical axis while it is guided by two guide bars, not shown.

Figure 4:
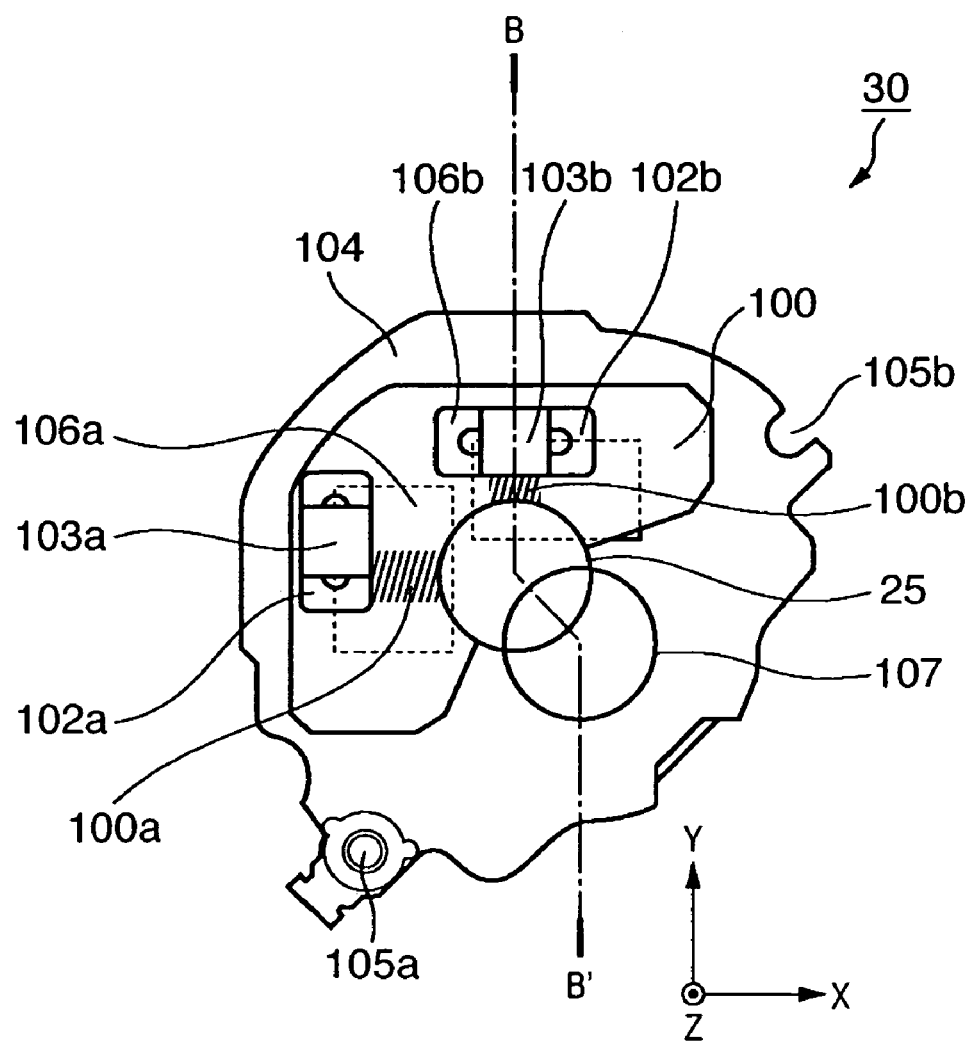
FIG. 4 is a plan view illustrating the structure of the image blurring correction unit in a collapsed state according to the embodiment of the present invention.
Figure 5:
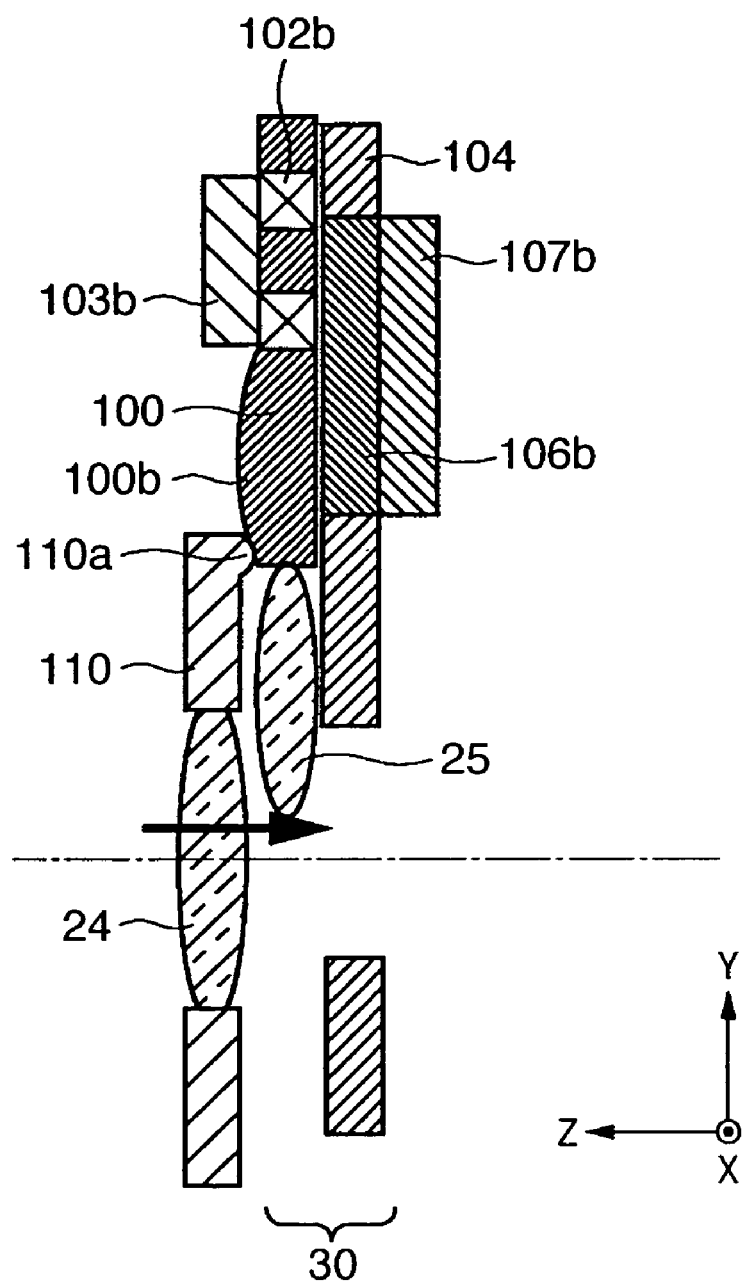
FIG. 5 is a sectional view illustrating the structure of the image blurring correction unit in the collapsed state according to the embodiment of the present invention.

FIG. 4 is a plan view of the image blurring correction unit 30 as seen from the side of the subject and illustrates the collapsed state. FIG. 5 is a sectional view taken along line B-B' of FIG. 4 (namely a sectional view along the Y direction) and also illustrates the third lens group 24. The collapsed state shown in FIGS. 4 and 5 is obtained by performing the collapsing operation.

First, at step S1, when image sensing operation ends and turning off of the power supply is designated, the fourth lens 26, which is the lens group for the focusing operation, starts collapsing. The fourth lens 26 is retracted in the direction that accommodates it inside the camera body 10 along the optical axis while it is guided by guide bars, not shown (step S2).

Next, the image blurring correction unit 30 collapses toward the direction of the image sensing device 12 along the optical axis (step S3). At this time the image blurring correction unit 30 is caused to collapse by being retracted into the space made vacant by the collapsing of the fourth lens 26 that performs the focusing operation. Accordingly, the range over which the image blurring correction unit 30 collapses is within the driving range A of the fourth lens 26 that performs the focusing operation in the image sensing state. At this time the two coils 102a, 102b of the image blurring correction unit 30 are energized while the image blurring correction unit 30 is collapsed (step S4). When the coils 102a, 102b start being energized, magnetism for driving the movable lens holder 100 along the X and Y directions is produced, whereby the lens 25 held by the movable lens holder 100 is moved to a position remote from the opening 107 of the lens holding frame 104, as shown in FIG. 4, to thereby be withdrawn to another location shifted away from the optical axis of the other lens groups (step S5).

The amount of movement of the movable lens holder 100 at this time is greater than the distance moved in order to correct for image blurring, and a state is attained in which the coils 102a, 102b and movable yokes 103a, 103b of the movable lens holder 100 protrude from the magnets 106a, 106b of the lens holding frame 104, as shown in FIG. 5. The supply of electricity to the coils 102a, 102b is continued and the movable lens holder 100 is maintained fixed at the withdrawal position.

With the lens 25 held by the movable lens holder 100 being kept withdrawn at the location remote from the optical axis of the other optical system, the lens holding frame 104 is pulled in and accommodated at the collapsed-state position while the image blurring correction unit 30 is guided by the two guide bars.

By thus withdrawing the lens 25 at the location remote from the optical axis of the other optical system, a space equivalent to thickness of the lens 25 is produced on the optical axis. The third lens group 24, which is not withdrawn from the optical axis, is further pulled into this space (step S6). At the moment the third lens group 24 is pulled in and attains the collapsed state, the electricity to the coils 102a, 102b is turned off (step S7). When the electricity to the coils 102a, 102b is turned off, the magnetism produced by the coils 102a, 102b vanishes.

Thus, when electricity is supplied to the coils 102a, 102b, the movable lens holder 100 is held fixed in such a manner that the coils 102a, 102b and the movable yorks 103a, 103b will protrude from the magnets 106a, 106b of the lens holding frame 104. When a transition is made from this state to the collapsed state and electricity to the coil 102a is turned off, the magnet 106a of the lens holding frame 104 attempts to pull the movable yoke 103a toward the optical axis in the X direction in FIG. 4 in order to maintain magnetically stable balance with respect to the movable yoke 103a of the movable lens holder 100. Similarly, the magnet 106b attempts to pull the movable yoke 103b toward the optical axis in the Y direction in FIG. 4.

However, in the collapsed state shown in FIG. 5, the third lens group 24, which is not withdrawn from the optical axis, is retracted into the space left vacant by withdrawing the lens 25 to the other location shifted away from the optical axis. As a result, the magnets 106a, 106b are fixedly held mechanically at the withdrawn position by the third lens group 24 even though the movable lens holder 100 attempts to return to the original optical axis.

In the retracted and collapsed state, the protuberance 110a provided on the holding member 110 abuts against the protuberance 110b of the movable lens holder 100, whereby the lens 25 and the third lens group 24 can be maintained at a distance at which they will not contact each other.

Further, the other lens groups are similarly retracted in a direction to accommodate them inside the camera body 10 along the optical axis, and the lens barrel 20 is accommodated completely within the camera body 10 to attain the collapsed state (step S8).

Figure 6:
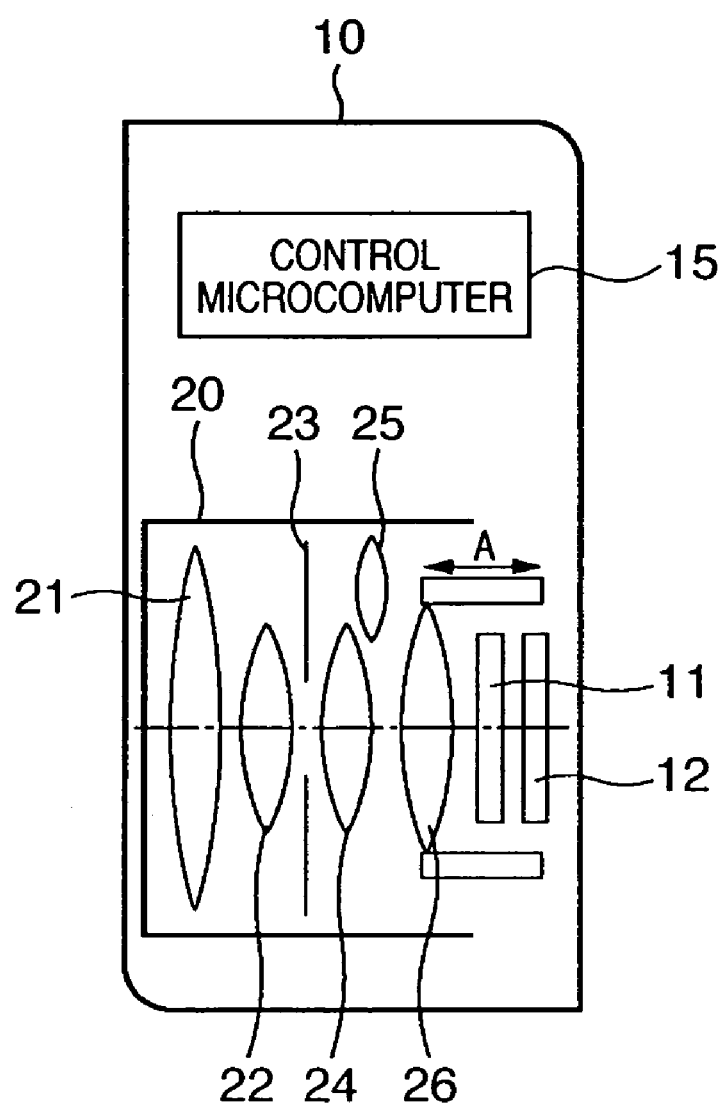
FIG. 6 is a conceptual view illustrating the structure of a lens system when lenses are collapsed in a digital camera having a collapsible-type zoom lens barrel according to an embodiment of the present invention.

Thus, by withdrawing the movable lens holder 100 to the location shifted away from the optical axis, the third lens group 24 is made to retract into the vacated space, whereby it is possible to accommodate the lenses in the manner shown in FIG. 6. This makes it possible to further reduce the accommodating length of the collapsible-type lens barrel. Further, since the movable lens holder 100 is held in the withdrawn position mechanically, there is no consumption of electric power for holding the movable lens holder 100 at the withdrawn position in the collapsed state.

As described above, by performing control to collapse the lens barrel by the control microcomputer 15, the third lens group 24 and the fourth lens 26 for focusing are pulled in and placed in the collapsed state utilizing effectively the space of the withdrawn lens 25 and the space of the area A for focusing while the fourth lens 26 and lens 25 are prevented from colliding with each other.

It should be noted that when the camera again transitions from the collapsed state of the lens to the image sensing state, the lens group is again projected along the optical axis.

When the collapsed state is in effect, the lens 25 is inhibited from returning to the original optical axis by the third lens group 24. However, by projecting the restraining third lens group 24, the urging force on the movable lens holder 100 vanishes. As a result, owing to the force by which the magnets 106a, 106b secured to the lens holding frame 104 attempt to attract the movable yokes 103a, 103b of the movable lens holder 100, the lens 25 held by the movable lens holder 100 can be restored to the same optical axis as that of the other optical system. At this time it is unnecessary to energize the coils 102a, 102b, and the movable lens holder 100 can be restored only by the force by which the magnets 106a, 106b attract the movable yokes 103a, 103b. As a result, no power is consumed to restore the movable lens holder 100.

At the time of the projecting operation, the protuberance 100a of the movable lens holder 100 and the protuberance 110a of the holding member 110 of third lens group 24 come into abutting contact and the distance between the lens 25 and third lens group 24 is maintained, as a result of which the lenses can be prevented from contacting each other.

Further, this embodiment is such that electricity is supplied to both of the X- and Y-direction coils 102a, 102b of the movable lens holder 100 of the image blurring correction unit 30, thereby effecting withdrawal to the position shifted along both the X and Y directions, as shown in FIG. 4. However, electricity may just as well supplied to one of the X- and Y-direction coils to effect movement to one side, namely in either the X or Y direction. In other words, as long as the lens 25 is withdrawn to another location shifted away from the optical axis of the other optical system, to which position it is withdrawn does not matter.

Further, with regard to the image blurring correction unit 30, this embodiment is such that the movable lens holder 100 on the movable side is equipped with the coils 102a, 102b, and the lens holding frame 104, which is on the stationary side, is equipped with the magnets 106a, 106b. However, any arrangement may be adopted for the image blurring correction unit 30 as long as the lens is off-centered by energizing coils.

In accordance with this embodiment, as described above, the off-centering mechanism of the image blurring correction unit is utilized, the lenses of the image blurring correction unit are withdrawn to another location shifted away from the optical axis of the other optical system at the time of collapse, and a lens group that is not withdrawn from the optical axis is retracted into the vacated space. As a result, the accommodating length of the lens barrel in the collapsed state when an image is not being sensed can be made less than the overall thickness of the lenses.

Further, a complicated mechanism need not be added on solely for the purpose of reducing the accommodating length. It is possible to reduce the accommodating length by a simple arrangement that utilizes the image blurring correction mechanism.

Further, in the collapsed state and in the projecting operation, the lens of the image blurring correction unit is held at a suitable location by the urging force of a lens group that is not withdrawn from the optical axis and that is retracted into the space left vacant by the withdrawal of the lens of the image blurring correction unit from the optical axis. As a result, it is unnecessary to energize the image blurring correction unit and it can be arranged so that there is no rise in power consumption.

Figure 7:
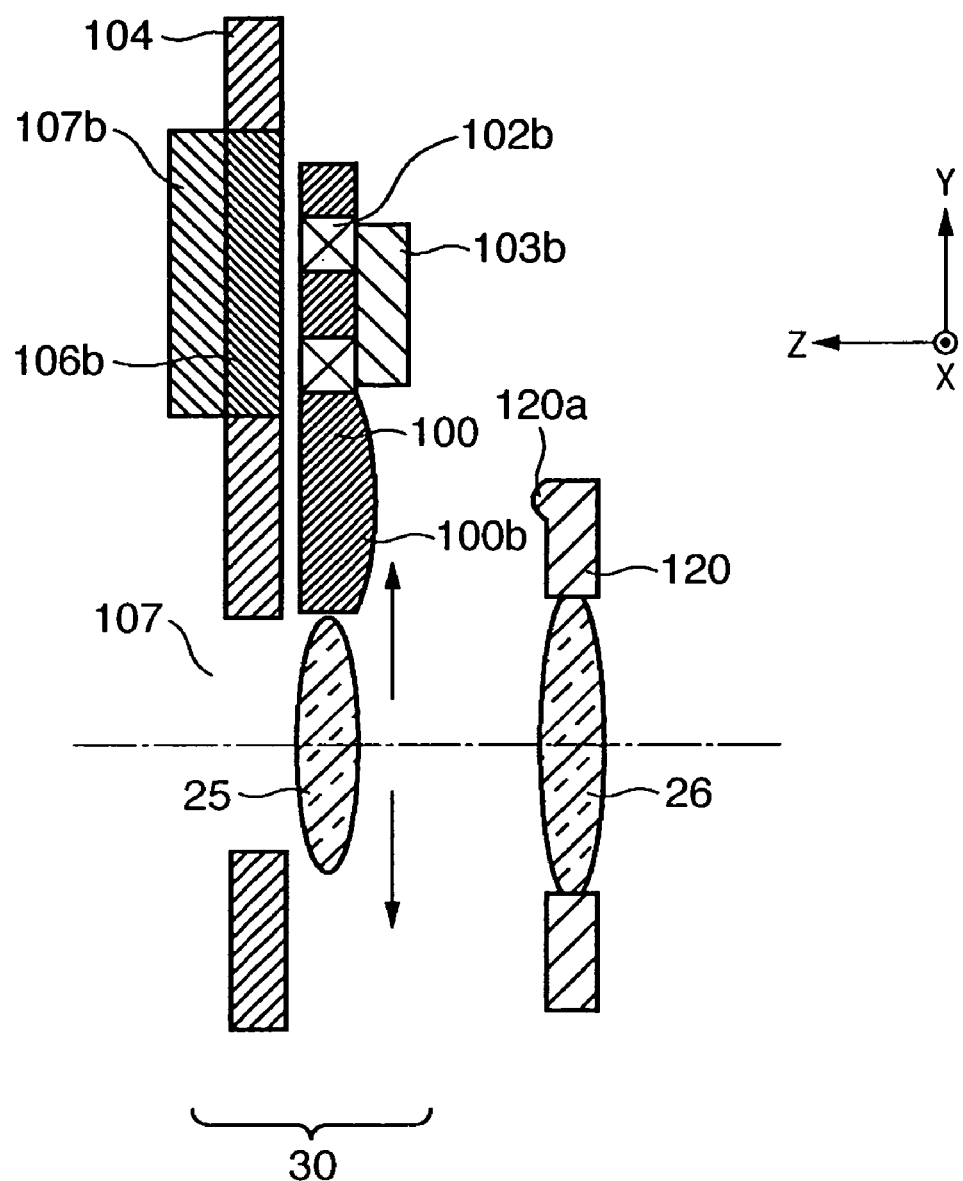
FIG. 7 is a sectional view illustrating another structure of an image blurring correction unit in the image sensing state according to an embodiment of the present invention.

In the embodiment set forth above, an example is described in which the movable lens holder 100 holding the lens 25 is on the subject side with respect to on the lens holding frame 104. However, the movable lens holder 100 can be arranged on the side of the image sensing device 12 with respect to the lens holding frame 104. For example, FIG. 3 illustrates the arrangement in a case where the image sensing device 12 is on the right side of the figure. However, the movable lens holder 100 may be placed on the side of the image sensing device 12 with respect to the lens holding frame 104, as illustrated in FIG. 7. In this case, it is possible to feed in the fourth lens 26, which is on the side of the image sensing device 12, in the area of the driving range of the fourth lens 26. In FIG. 7, reference characters 120, 120a correspond to the holding member 110 and protuberance 110a, respectively, and the function thereof is as described above.

Furthermore, in this embodiment, it is described that one lens, which is not withdrawn from the optical axis, is retracted into the space left vacant by withdrawal of the lens 25 of the image blurring correction unit from the optical axis. However, it may be so arranged that the third lens group 24 and fourth lens 26 are retracted, so as to bracket the lens 25 from both sides, into the space left vacant by withdrawal of the lens 25 of the image blurring correction unit from the optical axis. By thus retracting the lenses on both sides of the lens 25, the accommodating length of the lens barrel can be reduced further in the collapsed state that prevails when an image is not being sensed. In this case, with regard to the positional relationship between the movable lens holder 100 and lens holding frame 104, these components may be arranged in the order shown in FIG. 3 or in the order shown in FIG. 7.

As many apparently widely different embodiments of the present invention can be made without departing from the spirit and scope thereof, it is to be understood that the invention is not limited to the specific embodiments thereof except as defined in the appended claims.

What is claimed is:

1. A retractable-type lens barrel, comprising:
   an image blurring correction unit that drives a first lens in a plane orthogonal to an optical axis so as to cancel shaking of an image sensing apparatus; and
   a second lens placed adjacent said image blurring correction unit;
   wherein said image blurring correction unit is adapted to withdraw the first lens, in a motion orthogonal to the optical axis, to a position away from the optical axis of said second lens, such that the second lens may enter at least part of a space on the optical axis produced by the withdrawal of the first lens.

2. The lens barrel according to claim 1, wherein said image blurring correction unit includes: a holding unit that holds the first lens; and two electromagnetic actuators that drive in two mutually perpendicular directions in a plane orthogonal to the optical axis; wherein by energizing said electromagnetic actuators, said holding unit is driven to thereby drive the first lens and, in the retracted state of the lens barrel, to thereby cause the first lens to withdraw to the position away from the optical axis of said second lens.

3. The lens barrel according to claim 2, further comprising a second holding unit that holds said second lens; wherein in the retracted state of the lens barrel, energizing of said electromagnetic actuators is halted and said second holding unit holds said holding unit mechanically at a position prevailing when energizing is halted.

4. The lens barrel according to claim 1, further comprising: a first holding unit that holds the first lens; and a second holding unit that holds said second lens; wherein said first and second holding units have respective ones of protuberances which, by coming into contact with each other in the retracted state of the lens barrel, maintain such a distance that said first and second lenses will not contact each other.

5. The lens barrel according to claim 1, wherein said second lens is placed on the side of a subject with respect to said image blurring correction unit.

6. The lens barrel according to claim 1, wherein said second lens is placed on the side of an image sensing device with respect to said image blurring correction unit.

7. The lens barrel according to claim 1, further comprising a third lens placed adjacent said image blurring correction unit on a side opposite said second lens with respect to said image blurring correction unit; wherein when said image blurring correction unit has caused the first lens to withdraw to a position away from the optical axis of said second lens in the apsed state of the retractable-type lens barrel, said third lens is caused to retract in such a manner that a portion of said third lens enters at least part of the space on the optical axis produced by the withdrawal of the first lens.

8. The lens barrel according to claim 1, wherein the space on the optical axis includes at least a lens driving area for focusing.

9. An image sensing apparatus having the retractable-type lens barrel set forth in claim 1.

10. A method of controlling a collapsible retractable-type lens barrel having an image blurring correction unit that drives a first lens in a plane orthogonal to an optical axis so as to cancel shaking of an image sensing apparatus, and a second lens placed adjacent the image blurring correction unit, said method comprising the steps of:

causing the first lens of the image blurring correction unit to withdraw, in a motion orthogonal to the optical axis, to a position away from the optical axis of the second lens in the retracted state of the retractable-type lens barrel; and causing the second lens to retract in such a manner that a portion of said second lens enters at least part of a space on the optical axis produced by the withdrawal of the first lens.

* * * * *

UNITED STATES PATENT AND TRADEMARK OFFICE
CERTIFICATE OF CORRECTION

PATENT NO. : 7,454,129 B2
APPLICATION NO. : 11/254437
DATED : November 18, 2008
INVENTOR(S) : Yosuke Fukai Page 1 of 1

It is certified that error appears in the above-identified patent and that said Letters Patent is hereby corrected as shown below:

Column 9, Claim 7, line 1, "apsed" should read --retracted--.

Signed and Sealed this

Twenty-fourth Day of February, 2009

JOHN DOLL
*Acting Director of the United States Patent and Trademark Office*